United States Patent
Factor et al.

(10) Patent No.: US 6,996,688 B2
(45) Date of Patent: Feb. 7, 2006

(54) METHOD, SYSTEM, AND PROGRAM FOR IMPROVED THROUGHPUT IN REMOTE MIRRORING SYSTEMS

(75) Inventors: Michael E. Factor, Haifa (IL); Shachar Fienblit, Ein Ayala (IL); Olympia Gluck, Haifa (IL); Joseph Smith Hyde, II, Tucson, AZ (US); Thomas Charles Jarvis, Tucson, AZ (US); William Frank Micka, Tucson, AZ (US); Gail Andrea Spear, Tucson, AZ (US); Martin Jacob Tross, Haifa (IL); Aviad Zlotnick, Netofah (IL)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 10/386,985

(22) Filed: Mar. 11, 2003

(65) Prior Publication Data

US 2004/0181640 A1    Sep. 16, 2004

(51) Int. Cl.
G06F 12/00 (2006.01)
G06F 13/00 (2006.01)

(52) U.S. Cl. .................. 711/162; 711/154; 711/161
(58) Field of Classification Search ............... 711/100, 711/117, 118, 144, 154, 161, 162; 709/213
See application file for complete search history.

(56) References Cited

U.S. PATENT DOCUMENTS

| | | | |
|---|---|---|---|
| 5,113,514 A * | 5/1992 | Albonesi et al. ............ 711/144 |
| 5,155,828 A * | 10/1992 | La Fetra et al. ............ 711/122 |
| 5,602,987 A | 2/1997 | Harari et al. |
| 5,606,532 A | 2/1997 | Lambrache et al. |
| 5,611,071 A | 3/1997 | Martinez, Jr. |
| 5,636,359 A * | 6/1997 | Beardsley et al. .......... 711/122 |
| 5,652,857 A | 7/1997 | Shimoi et al. |
| 5,671,229 A | 9/1997 | Harari et al. |
| 5,713,003 A | 1/1998 | DeWitt et al. |
| 5,715,424 A | 2/1998 | Jesionowski et al. |
| 5,719,808 A | 2/1998 | Harari et al. |
| 5,719,885 A | 2/1998 | Ofer et al. |
| 5,764,945 A | 6/1998 | Ballard |
| 5,765,185 A | 6/1998 | Lambrache et al. |
| 5,829,018 A | 10/1998 | Moertl et al. |
| 5,860,108 A * | 1/1999 | Horikawa .................. 711/141 |
| 5,862,080 A | 1/1999 | Harari et al. |
| 5,875,462 A * | 2/1999 | Bauman et al. ............. 711/119 |
| 5,877,986 A | 3/1999 | Harari et al. |
| 5,901,327 A * | 5/1999 | Ofek ............................ 710/5 |
| 5,936,971 A | 8/1999 | Harari et al. |
| 5,940,858 A | 8/1999 | Green |
| 5,960,452 A | 9/1999 | Chi |
| 5,991,847 A | 11/1999 | Ballard et al. |
| 5,999,446 A | 12/1999 | Harari et al. |
| 6,014,728 A * | 1/2000 | Baror ........................ 711/133 |

(Continued)

Primary Examiner—Tuan V. Thai
(74) Attorney, Agent, or Firm—Janaki K. Davda; Konrad Raynes & Victor LLP

(57) ABSTRACT

Disclosed is a method, system, and program for reducing an mount of data transferred. Indicators of sub-blocks modified for a block of data since the block of data was last sent to remote storage are maintained until the block of data is demoted. The maintained indicators are used to identify sub-blocks on the block of data for transfer to the remote storage.

Disclosed is a method, system, and program for managing metadata in cache. A first policy is used to determine when to remove data from a primary cache, and a second policy is used to determine when to remove data from a metadata cache.

33 Claims, 9 Drawing Sheets

U.S. PATENT DOCUMENTS

| | | |
|---|---|---|
| 6,115,794 A | 9/2000 | Arimilli et al. |
| 6,149,316 A | 11/2000 | Harari et al. |
| 6,247,097 B1 | 6/2001 | Sinharoy |
| 6,272,590 B1 | 8/2001 | Riedle |
| 6,298,415 B1 | 10/2001 | Riedle |
| 6,304,485 B1 | 10/2001 | Harari et al. |
| 2003/0081596 A1 * | 5/2003 | Kikidis et al. ............... 370/356 |
| 2003/0204677 A1 * | 10/2003 | Bergsten ...................... 711/144 |
| 2003/0217119 A1 * | 11/2003 | Raman et al. ............... 709/219 |
| 2004/0024973 A1 * | 2/2004 | Chron et al. ................. 711/144 |

* cited by examiner

| RMS Modified Sectors Structure (RMSMSS) 138 | | | | | |
|---|---|---|---|---|---|
| Sector 1 150 | Sector 2 152 | Sector 3 153 | Sector 4 154 | Sector 4 156 | ... |

FIG. 2B

METHOD, SYSTEM, AND PROGRAM FOR IMPROVED THROUGHPUT IN REMOTE MIRRORING SYSTEMS

BACKGROUND OF THE INVENTION

1. Field of the Invention

The present invention is directed to improved throughput in remote mirroring systems, such as peer to peer remote copy.

2. Description of the Related Art

Disaster recovery systems typically address two types of failures, a sudden catastrophic failure at a single point in time or data loss over a period of time. In the second type of gradual disaster, updates to volumes on data storage may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides several remote mirroring systems, including, for example: a synchronous Peer-to-Peer Remote Copy (PPRC®) service and a PPRC® Extended Distance service in an Enterprise Storage Server (ESS) system.

The synchronous PPRC® service provides a technique for recovering data updates that occur between a last, safe backup and a system failure. Such data shadowing systems can also provide an additional remote copy for non-recovery purposes, such as local access at a remote site.

With the synchronous PPRC® service, a primary storage subsystem maintains a copy of predefined datasets on a secondary storage subsystem. The copy may be used for disaster recovery. Changes to data are copied to the secondary storage subsystem as an application updates the data. Thus, the copy may be used whether there are gradual and/or intermittent failures. The copy is maintained by intercepting write instructions to the synchronous PPRC® dataset and generating appropriate write instructions from the primary storage system to the secondary storage system. The write instructions may update data, write new data, or write the same data again.

The synchronous PPRC® service copies data to the secondary storage subsystem to keep the data synchronous with a primary storage subsystem. That is, an application system writes data to a volume and then transfers the updated data over, for example, Enterprise System Connection (ESCON®) fiber channels to the secondary storage subsystem. The secondary storage subsystem writes the data to a corresponding volume. Only when the data is safely written to volumes at both the primary and secondary storage subsystems does the application system receive assurance that the volume update is complete.

With synchronous PPRC®, the copy at the secondary storage subsystem is maintained by intercepting write instructions to the dataset at the primary storage subsystem and generating appropriate write instructions from the primary storage system to the secondary storage system.

PPRC® Extended Distance service does not write to secondary storage subsystem before acknowledging the write to the primary. Instead, for the PPRC® Extended Distance service, when a track is written, information is stored that indicates that the track is to be transferred to the secondary storage subsystem at a later time. An asynchronous process collects updates at the primary storage subsystem and sends the updates to the secondary storage subsystem.

In maintaining the data at the secondary storage subsystem, the primary storage subsystem sometimes transfers an entire track of data, even if less than all sectors on the track were modified. Such a transfer results in inefficient use of bandwidth between the primary storage subsystem and the secondary storage subsystem. Thus, there is a need in the art for improved throughput in remote mirroring systems, such as peer to peer remote copy.

SUMMARY OF THE INVENTION

Provided are a method, system, and program for reducing an amount of data transferred. Indicators of sub-blocks modified for a block of data since the block of data was last sent to remote storage are maintained until the block of data is demoted. The maintained indicators are used to identify sub-blocks on the block of data for transfer to the remote storage.

Also provided are an alternative method, system, and program for managing metadata in cache. A first policy is used to determine when to remove data from a primary cache, and a second policy is used to determine when to remove data from a metadata cache.

The described implementations of the invention provide a method, system, and program for transferring sub-blocks of a block of data rather than the entire block of data, if the block of data is in cache, and where the sub-blocks have been modified since the block of data was last transferred to remote storage.

BRIEF DESCRIPTION OF THE DRAWINGS

Referring now to the drawings in which like reference numbers represent corresponding parts throughout:

FIGS. 2A and 2B illustrate, in block diagrams, further details of caches in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1A:
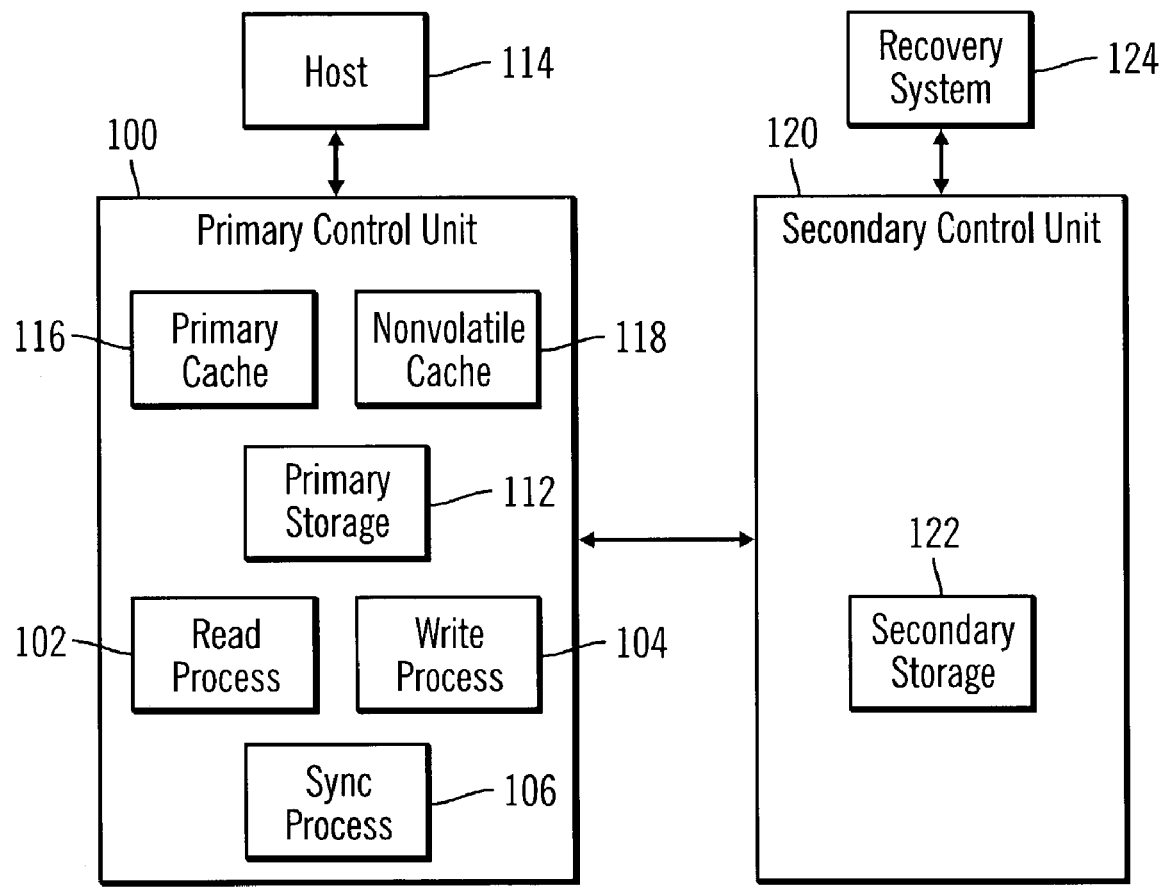
FIGS. 1A and 1B illustrate, in block diagrams, a computing environment in accordance with certain implementations of the invention.
Figure 1B:
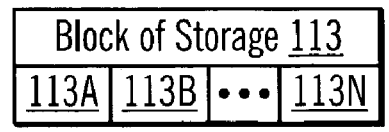

FIGS. 1A and 1B illustrate, in block diagrams, a computing environment in accordance with certain implementations of the invention. A primary control unit 100 provides one or more hosts 114 access to primary storage 112, such as Direct Access Storage Device (DASD). The primary storage 112 may be divided into blocks of storage 113 containing blocks of data, and the blocks of storage 113 are further divided into sub-blocks of storage (113A–113N, where N may be any number) that contain sub-blocks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The primary control unit 100 includes a primary cache 116 in which updates to tracks in the primary storage 112 are maintained until written to primary storage 112 (i.e., the tracks are destaged). Additionally, the primary control unit 100 includes a nonvolatile cache 118. The non-volatile cache 118 may be, for example, a battery-backed up volatile memory, to maintain a non-volatile copy of data updates.

The primary control unit 100 includes a read process 102 for reading data, and a write process 104 for writing data. The primary control unit 100 also includes a sync process 106 for transferring data from the primary control unit 100 to remote storage, such as storage at the secondary control unit 120. In certain implementations, the sync process 106 may perform synchronization of data for the synchronous PPRC® and for PPRC® Extended Distance. In such cases, the sync process 106 runs continuously for PPRC® Extended Distance, and starts up and completes for host writes for the synchronous PPRC®. In certain implementations, there may be multiple sync processes (e.g., different sync processes for synchronous PPRC® and for PPRC® Extended Distance or one sync process for each volume on primary storage 112 for PPRC® Extended Distance). In certain implementations, the read process 102, write process 104, and sync process 106 are implemented as firmware.

Secondary control unit 120 provides one or more recovery systems 124 access to disk storage, such as secondary storage 122, which maintains back-up copies of all or a subset of the volumes of the primary storage 112. Secondary storage may be a Direct Access Storage Device (DASD). Secondary storage 122 is also divided into blocks of storage containing blocks of data, and the blocks of storage are further divided into sub-blocks of storage that contain sub-blocks of data. In certain implementations, the blocks of data are tracks, while the sub-blocks of data are sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

In certain implementations, removable storage (instead of or in addition to remote storage, such as secondary storage 122) may be used to maintain back-up copies of all or a subset of the primary storage 112, and the techniques of the invention transfer data to the removable storage rather than to the remote storage. The removable storage may reside at the primary control unit 100.

In certain implementations, the primary control unit 100 and secondary control unit 120 may be comprised of the IBM 3990, Model 6 Storage Controller, Enterprise Storage Server, or any other control unit known in the art.

In certain implementations, the primary control unit 100 and/or secondary control unit 120 may comprise any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units, recovery systems, and secondary storage.

In certain implementations of the invention, data is maintained in volume pairs. A volume pair is comprised of a volume in a primary storage device (e.g., primary storage 112) and a corresponding volume in a secondary storage device (e.g., secondary storage 122) that includes a consistent copy of the data maintained in the primary volume. For example, primary storage 112 may include Volume1 and Volume2, and secondary storage 122 may contain corresponding Volume1 and Volume2. A primary storage controller may be provided to control access to the primary storage and a secondary storage controller may be provided to control access to the secondary storage.

In certain implementations, the primary control unit 100 and secondary control unit 120 communicate via communication paths, such as direct high speed transmission lines (e.g., an Enterprise System Connection (ESCON®) link. However, the communication paths may be comprised of any other communication means known in the art, including network transmission lines, fiber optic cables, etc.

In certain implementations, the primary storage 112 and secondary storage 122 are physically divided into tracks, which are physically divided into sectors. Although the examples herein refer to dividing storage physically into tracks and sectors, the technique of the invention is applicable to any division of storage.

Using the primary cache 116 of fast memory to store tracks from primary storage 112, the primary control unit 100 is able to operate at speeds that are orders of magnitude higher than the speeds available from accessing the primary storage 112 for the tracks. For a read operation, this is possible because input/output (I/O) operations tend to be clustered around the same locations, and it is possible to anticipate which tracks are best to have in primary cache 116. For a write operation, this is possible due to the capability of the primary cache 116 to buffer write operations, and is especially effective in situations of "burst" writes. A burst write refers to writing of a sequence of data counted as one unit in accordance With some specific criterion or measure. A write operation may update data, write new data, or write the same data again.

Initially, host 114 writes data to a track in primary cache 116. Write operations modify the track in primary cache 116 synchronously (i.e., writing host 114 waits for the operation to complete), and then, in a background process, primary cache 116 content is Written to primary storage 112. Writing data in primary cache 116 to primary storage 112 is called a destage operation. With a destage operation, the cached track is not removed from primary cache 116. When a cached track has to be removed from primary cache 116 in order to free space for other data, the cached track is said to be demoted. In most cases, destage occurs prior to demotion. Copying all or a portion of a track from primary storage 112 to primary cache 116 is a staging operation. Creating a track in primary cache 116 is a promotion operation and involves creating a directory entry. A promotion operation can happen without a stage operation. One example would be when a track not previously in primary cache 116 is written to primary cache 116 by a host 114.

Figure 2A:
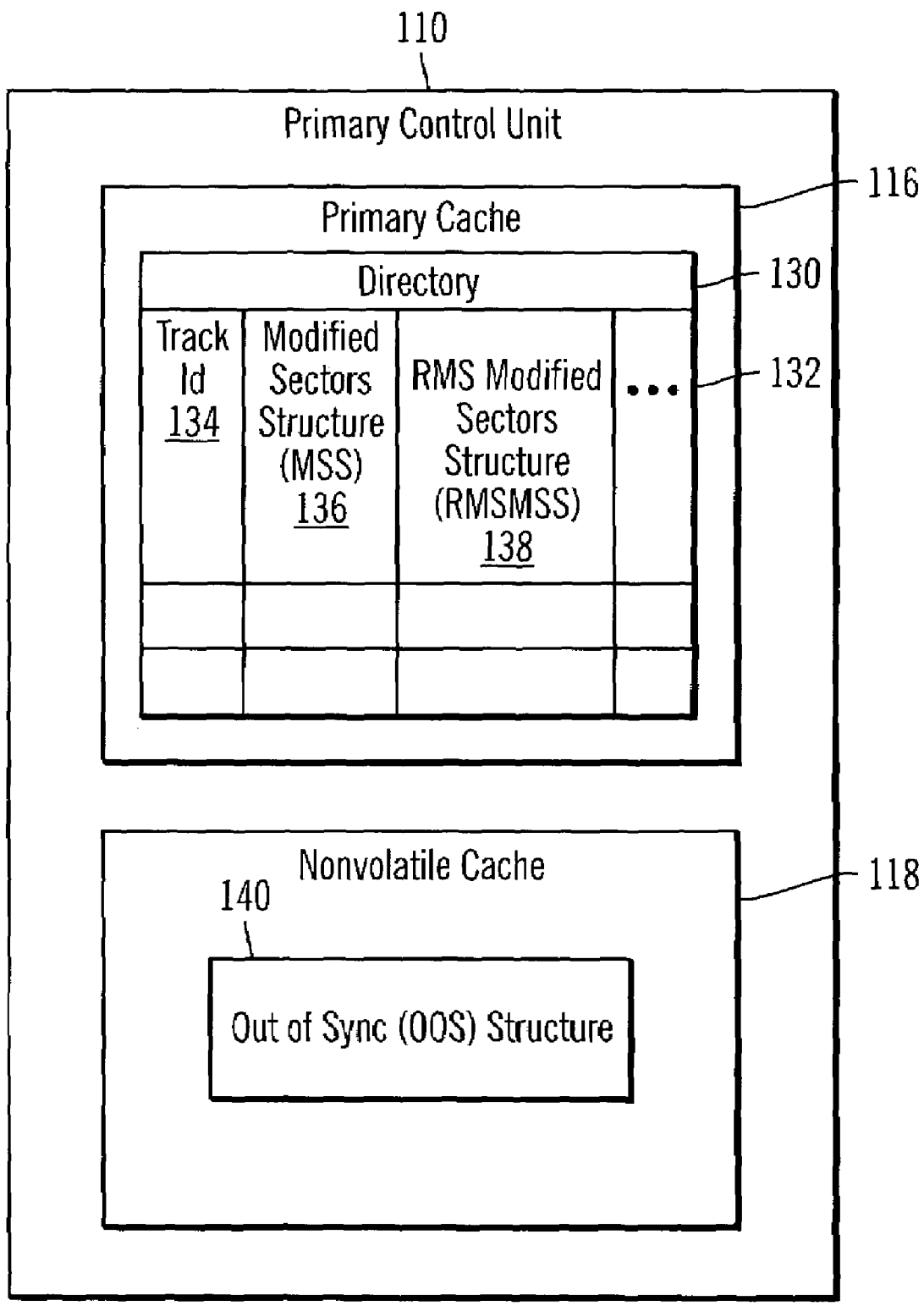

FIGS. 2A and 2B illustrate, in block diagrams, further details of caches 116 and 118 in accordance with certain implementations of the invention. In particular, primary cache 116 includes a directory 130. Directory 130 includes one or more directory entries, such as directory entry 132. Each directory entry includes a track identifier 134, a modified sectors structure 136 (e.g., a bitmap), a remote mirroring system (RMS) modified sectors structure 138 (RMSMSS) (e.g., a bitmap), and may include other information represented by the ellipses. The modified sectors structure 136 is an example of a modified sub-blocks structure. The modified sectors structure 136 includes indicators (e.g., bits) that are used to determine which sectors of a track have been modified before the track is destaged. The RMS modified sectors structure 138 is an example of an RMS modified sub-blocks structure. The RMS modified sectors structure 138 is used to determine which sectors of a track have been modified since the track was last sent to the secondary control unit 120. Structure 138 may be any structure that maintains indicators of sub-blocks modified for a block of data since the block of data was last sent to remote storage.

FIG. 2B illustrates further details of the RMS modified sectors structure 138 in accordance with certain implementations of the invention. The RMS modified sectors structure 138 includes an indicator for each sector (e.g., 150–158) indicating whether that sector has been modified since the track was last copied to the secondary control unit 120.

In certain implementations, when the write process 104 writes data to a track, the write process 104 determines whether a RMS modified sectors structure 138 is available for the track. If the RMS modified sectors structure 138 is available, the write process 104 updates the RMS modified sectors structure 138. If the RMS modified sectors structure 138 is not available, the write process 104 creates and updates a RMS modified sectors structure 138. In certain implementations, when a directory entry is created for a track, an RMS modified sectors structure 138 is available for the track.

Nonvolatile cache 118 includes an out of sync (OOS) structure 140 (e.g., a bitmap). The out of sync structure 140 is used to determine which tracks have been modified since the last transfer to the secondary control unit 120, without regard to the particular modified sectors of the track. The out of sync structure 140 includes an out of sync (OOS) indicator (e.g., bit) for each track, which indicates whether any portion of the track has been modified since the last time the track was copied to the secondary control unit 120. In certain implementations, there is one out of sync structure 140 for each volume on primary storage 112. In certain implementations, the out of sync structure 140 resides in volatile cache, such as primary cache 116, with a copy on primary storage 112, and only changes to the out of sync structure 140 are stored in nonvolatile cache 118.

For synchronous PPRC®, before the host 114 completes writing a chain of tracks to the primary control unit 100, all tracks in the chain must have also been transferred to the secondary control unit 120. In certain implementations, this transfer would be accomplished by a synchronization process (e.g., sync process 106), which must have completed before an acknowledgment of completion of the write process is sent to the host 114.

For PPRC® Extended Distance, the host 114 will complete writing a track to the primary control unit 100 without the track having been sent to the secondary control unit 120. After the track has been written to the primary control unit 100, the sync process 106 will discover that the indicator corresponding to the track is set in the out of sync structure 140 and will send the track to the secondary control unit 120. That is, the track is sent asynchronously with respect to the track written by the host.

When accessing a track, the directory 130 is used to determine whether the track is in primary cache 116. If the track is in the primary cache 116, the directory 130 will include an entry indicating the location of the track. If the track is not in the primary cache 116, the directory 130 will not have an entry for that track, and the track will be promoted. When a track has been demoted, the entry in the directory 130 for the demoted track is removed.

Since data for primary storage 112 is physically divided into tracks, which are further physically divided into sectors and/or blocks, information is frequently written in sectors or blocks. A block may be one or more count-key-data (CKD) records. A CKD record may also include multiple sub-blocks. In certain implementations, there are 112 sectors per track. A modified sectors structure 136 keeps track of modified sectors, and each track has an associated modified sectors structure 136. Once a destage has occurred, these sectors are marked as unmodified in the modified sectors structure 136.

In some modes of operation, there may be a time lag between the time a track is modified in the primary control unit 100 and the time the track is sent out to the secondary control unit 120. One of these modes of operation is a temporary suspension of peer to peer communications. Such suspensions may occur because of problems with communications lines or may be forced by application program logic. If the wait is not short, it is likely that the track will have been destaged, and the modified sectors information lost, by the time the transfer to the secondary control unit 120 occurs. That is, the modified sectors information is lost because the modified sectors are marked as unmodified in the modified sectors structure 136 upon destaging of the track. Moreover, in certain implementations, it is preferable to destage cached tracks as early as possible since primary storage 112 storage is less volatile than primary cache 116 memory. In certain implementations, there may be a conflict between destaging a track as early as possible and using the modified sectors structure 136 to determine which sectors should be sent to the secondary control unit 120.

It is possible to write the modified sectors structure 136 to the primary storage 112. The size of the modified sectors structure 136 is so small that it will hardly be felt in terms of storage overhead. However, the overhead of loading the information from the primary storage 112 (i.e., "staging") is high.

Additionally, an out of sync structure 140 is stored in nonvolatile cache 118. The out of sync structure 140 maintains one indicator per track, indicating whether any part of the track has been modified. This indicator is called the track's Out Of Sync (OOS) indicator, since the indicator indicates that this track is not yet synchronized with the secondary control unit 120 (i.e., the track has been modified since the last time the track was sent to the secondary control unit 120). When the time to transfer the track to the secondary control unit 120 comes, a track with a set OOS indicator is sent in its entirety, even if only one sector (e.g., less than 1% of the data volume) of the track has been modified.

Certain implementations of the invention modify the usage of primary cache 116 so as to extend the life of information on modified sectors by preserving a copy of the modified sectors structure 136 until a track is demoted from primary cache 116. In particular, a copy of the modified sectors structure 136 is maintained in primary cache 116 until the track is demoted, and this copy is referred to herein as an RMS Modified Sectors Structure (i.e., RMSMSS) 138 (i.e., it is a copy of a modified sectors structure). Demotion usually occurs much later than destaging, and it is usually done as late as possible.

Figure 3:
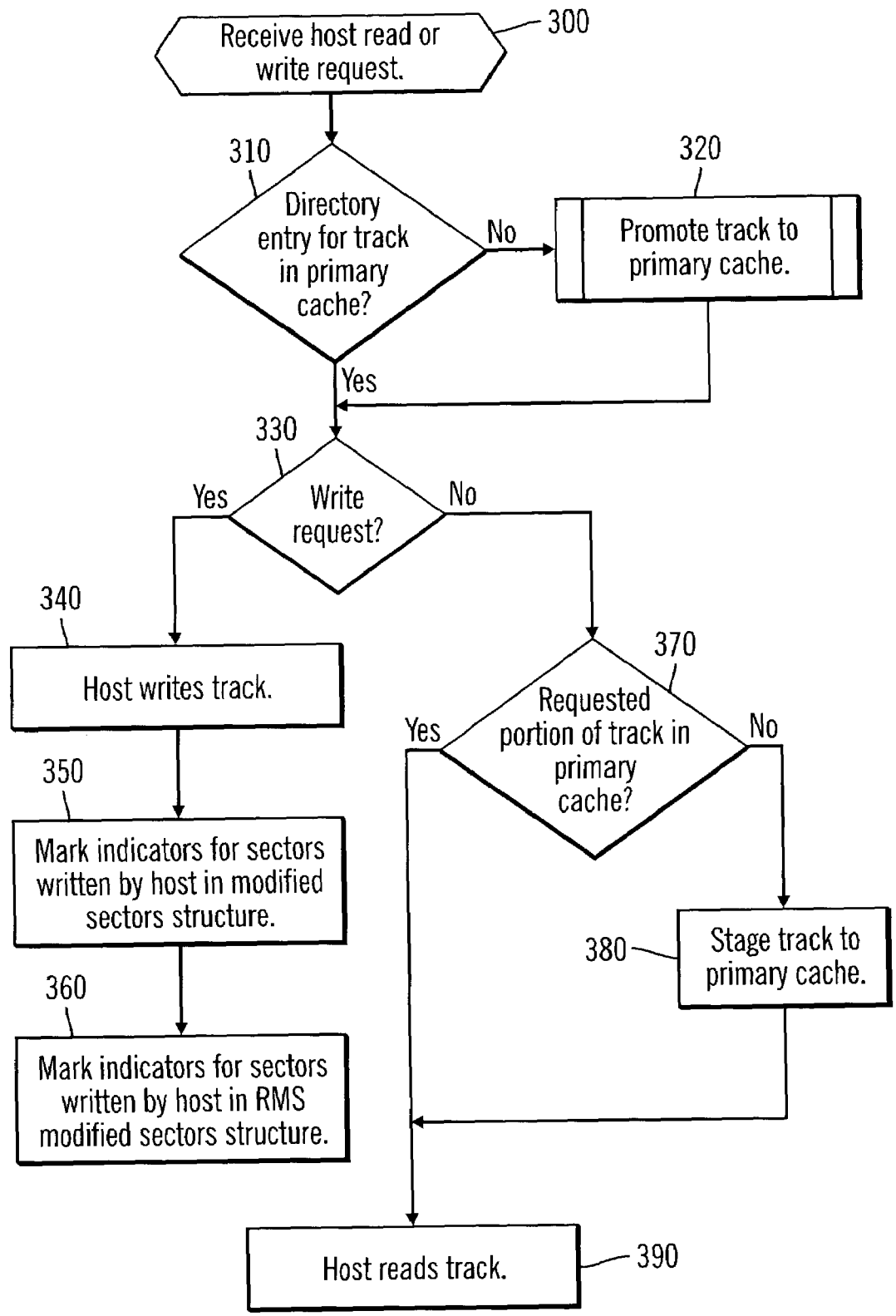
FIG. 3 illustrates logic implemented upon receipt of a host read or write request in accordance with certain implementations of the invention.

FIG. 3 illustrates logic implemented upon receipt of a host 114 read or write request in accordance with certain implementations of the invention. Control begins at block 300 with receipt of a host 114 read or write request (i.e., a type of host request to access a track). In block 310, it is determined whether a directory entry for the track specified in the host 114 request is in primary cache 116. If the directory entry is not in primary cache 116, processing continues to block 320, otherwise, processing continues to block 330. In block 320, the track is promoted to primary cache.

In block 330, it is determined whether the host 114 request is a write request. If the request is a write request to write a track (i.e., "write a block of data"), processing continues to block 340, otherwise, the request is a read request and processing continues to block 370.

In block 340, the host writes to the track. In block 350, indicators for sectors written by the host are set in the modified sectors structure 136 to indicate that the sectors are modified (e.g., set to one). In block 360, indicators for sectors written by the host are set in the RMS modified sectors structure 138 to indicate that the sectors are modified (e.g., set to one). In particular, in block 360, indicators are set for sectors that were written by the host 114 to indicate that the sectors were modified, and, in certain implementations, some indicators that had been previously set to indicate that the sectors are modified (e.g., set to one) may again be set to indicate that the sectors have been modified (e.g., again set to one). In certain implementations, indicators for sectors written by the host 114 whose indicators are not already set to indicate that the sectors are modified (e.g., set to one) in the RMS modified sectors structure 138 are set to indicate that the sectors are modified (e.g., set to one).

In block 370, it is determined whether the requested portion of the track is in primary cache 116. This determination is made because the availability of a directory entry does not necessarily mean that any portion of a track is available in primary cache 116. If the requested portion of the track is in primary cache 116, processing continues to block 390, otherwise, processing continues to block 380. In block 380, the track is staged to primary cache 116. In block 390, the host 114 reads the track.

Figure 4:
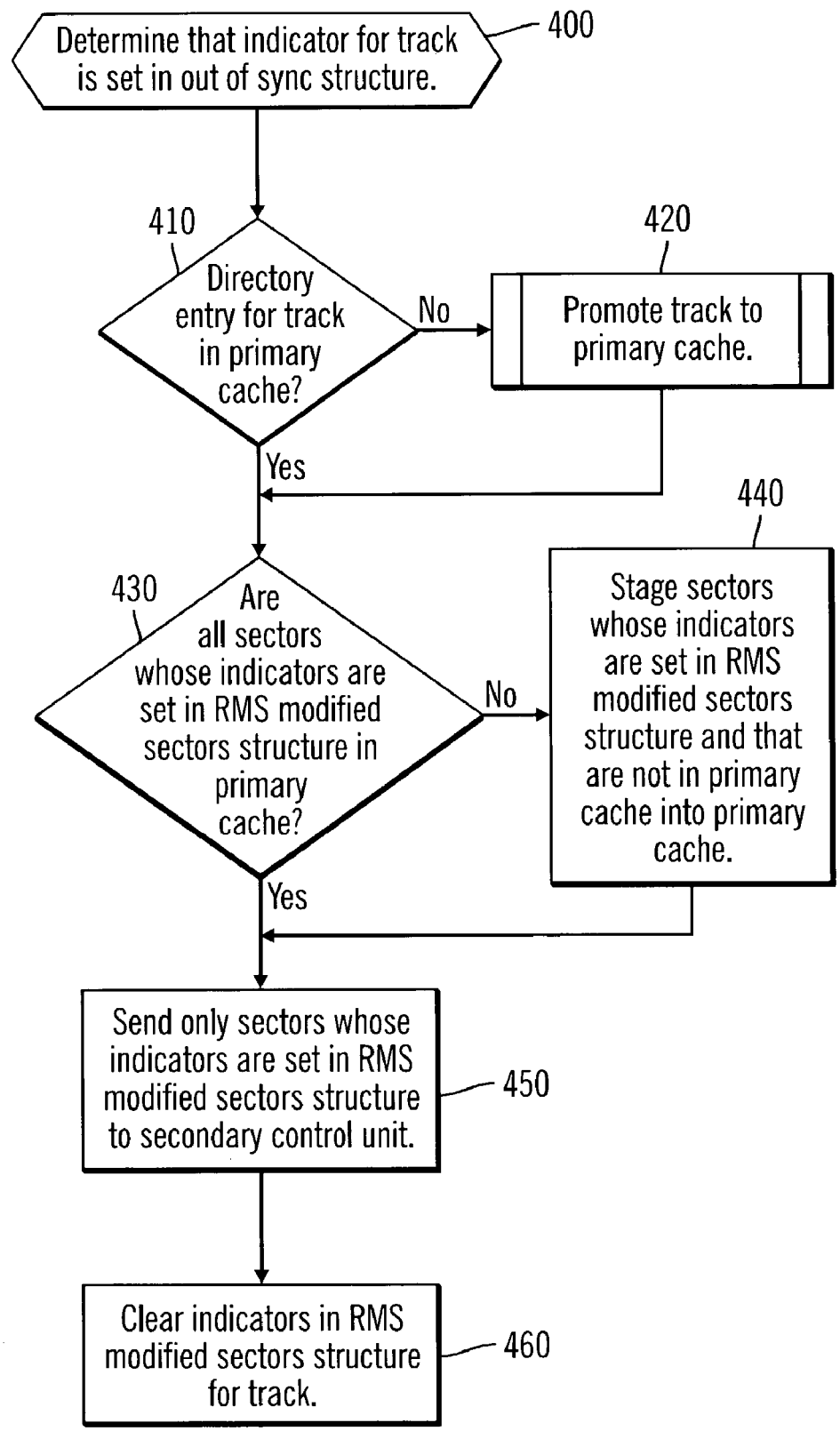
FIG. 4 illustrates logic implemented when copying data from primary cache to secondary control unit in accordance with certain implementations of the invention.

FIG. 4 illustrates logic implemented when copying data from primary cache 112 to secondary control unit 120 in accordance with certain implementations of the invention. Control begins at block 400 with a determination that the indicator for a track is set in the out of sync structure 140 to indicate that the track is out of sync with the secondary storage 122. In block 410, it is determined whether a directory entry for the track to be transferred to the secondary storage 122 is in primary cache 116. If the directory entry is not in primary cache 116, processing continues to block 420, otherwise, processing continues to block 430. In block 420, the track is promoted to primary cache.

In block 430, it is determined whether all sectors for which indicators are set to indicate that the sectors have been modified since the last transfer to the secondary storage 122 in the RMS modified sectors structure 138 are in primary cache 116. If so, processing continues to block 450, otherwise, processing continues to block 440.

In block 440, the sectors whose indicators are set in the RMS modified sectors structure 138 to indicate that the sectors have been modified, but which are not in primary cache 116, are staged into primary cache 116. In block 450, the sectors whose indicators are set in the RMS modified sectors structure 138 to indicate that the sectors were modified since the last transfer to secondary storage 122 are sent to secondary storage 122. In block 460, all indicators are cleared in the RMS modified sectors structure 138 to indicate that the sectors have not been modified since the last transfer to secondary storage 122.

Thus, certain implementations of the invention avoid full track transfers to secondary storage 122 at the secondary control unit 120 as long as the track is still in primary cache 116, without any extra disk I/O operations. Avoiding unnecessary full track transfers improves RMS performance, for example, during the use of techniques that are based on cycles of (re)establishing and suspending RMS connections.

In certain further implementations, a new data structure is introduced, which is referred to herein as a metadata cache, for preserving modified sectors information. With the metadata cache, it is possible to preserve modified sectors information even after a track is demoted.

Figure 5:
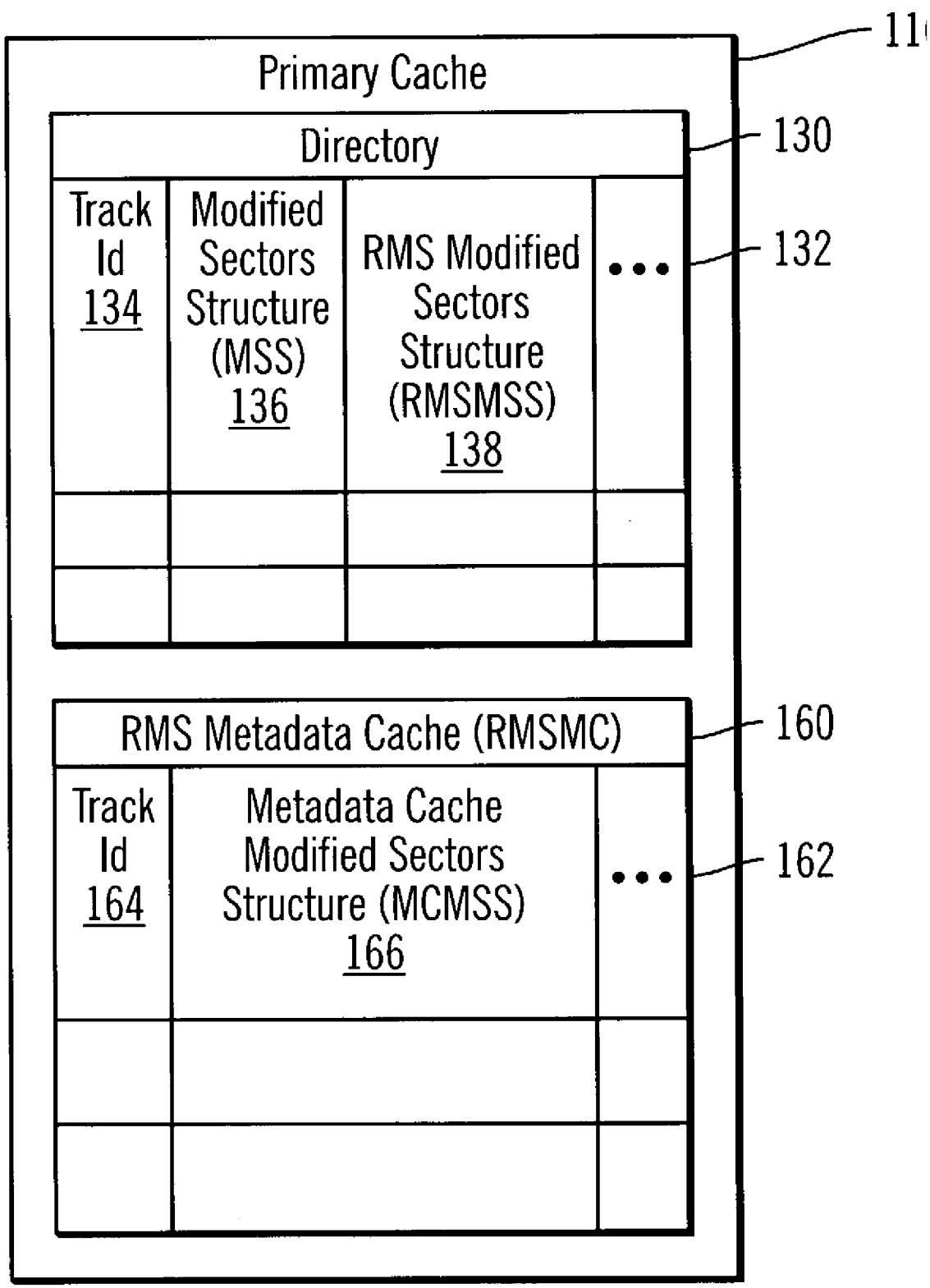
FIG. 5 illustrates, in a block diagram, further details of primary cache, in accordance with certain implementations of the invention.

FIG. 5 illustrates, in a block diagram, further details of primary cache 116, in accordance with certain implementations of the invention. The primary cache 116 includes directory 130 with entries, and each entry includes a primary copy of a modified sectors structure 138, which is a copy of the modified sectors structure 136 and which is maintained in directory 130 until the associated track is demoted. The primary cache 116 also includes a RMS metadata cache (RMSMC) 160. The RMS metadata cache 160 is a data structure (e.g., a table) that stores a track identifier 164 and a metadata cache modified sectors structure (MCMSS) 166 (i.e., a copy of the RMS modified sectors structure 138) for the track in an entry 162. In certain implementations, the RMS metadata cache 160 is not large enough to hold RMS modified sectors structures for all tracks in a system, because taking so much memory from customer data cache may have a significant adverse impact on system performance. Therefore, the RMS metadata cache 160 is small, and a metadata cache policy is provided to decide which copies of RMS modified sectors structures for tracks to keep in RMS metadata cache 160 and which to discard.

The decisions for keeping and discarding copies of RMS modified sectors structures (i.e., metadata cache modified sectors structure) may be based on one of a variety of metadata cache policies, such as, for example, a least recently used (LRU) cache policy, a most recently used (MRU) cache policy, or a penalty based cache policy.

For a LRU cache policy, the least recently used metadata cache modified sectors structure 166 is removed. For a MRU cache policy, the most recently used metadata cache modified sectors structure 166 is removed. For a penalty based cache policy, each metadata cache modified sectors structure 166 is assigned a penalty value, and a metadata cache modified sectors structure 166 is removed with the lowest penalty value. For instance, when a metadata cache modified sectors structure 166 is removed from the RMS metadata cache 160, a full track will be sent to the secondary storage unit 120. The penalty in this transfer is the number of unmodified sectors sent (i.e., all sectors rather than a few sectors), and, accordingly, the RMS metadata cache 160 policy is to retain tracks in cache with fewer modified sectors over tracks with more modified sectors.

For the penalty based cache policy, the penalty value may be assigned based on a quality of service standard or a geographic standard. For example, as to a quality of service standard, a higher penalty value may be assigned to data for a customer who has paid more money than others or otherwise holds a "Very Important Person"(VIP) status. Moreover, as to the geographic standard, a higher penalty may be assigned to data that is to be transferred to closer remote storage (e.g., secondary control unit 120). Many other techniques may be used in addition or instead to assign penalty values.

In certain implementations, data (e.g., a track) is removed from the primary cache 116 using a least recently used policy, while data (e.g., a metadata cache modified sectors structure 166) is removed from the metadata cache 160 using a different policy. For example, metadata cache modified sectors structure 166 with a largest number of indicators indicating that sub-blocks have been modified since a block of data was last transferred to remote storage may be removed before other metadata cache modified sectors structures are removed from the metadata cache 160.

Figure 6:
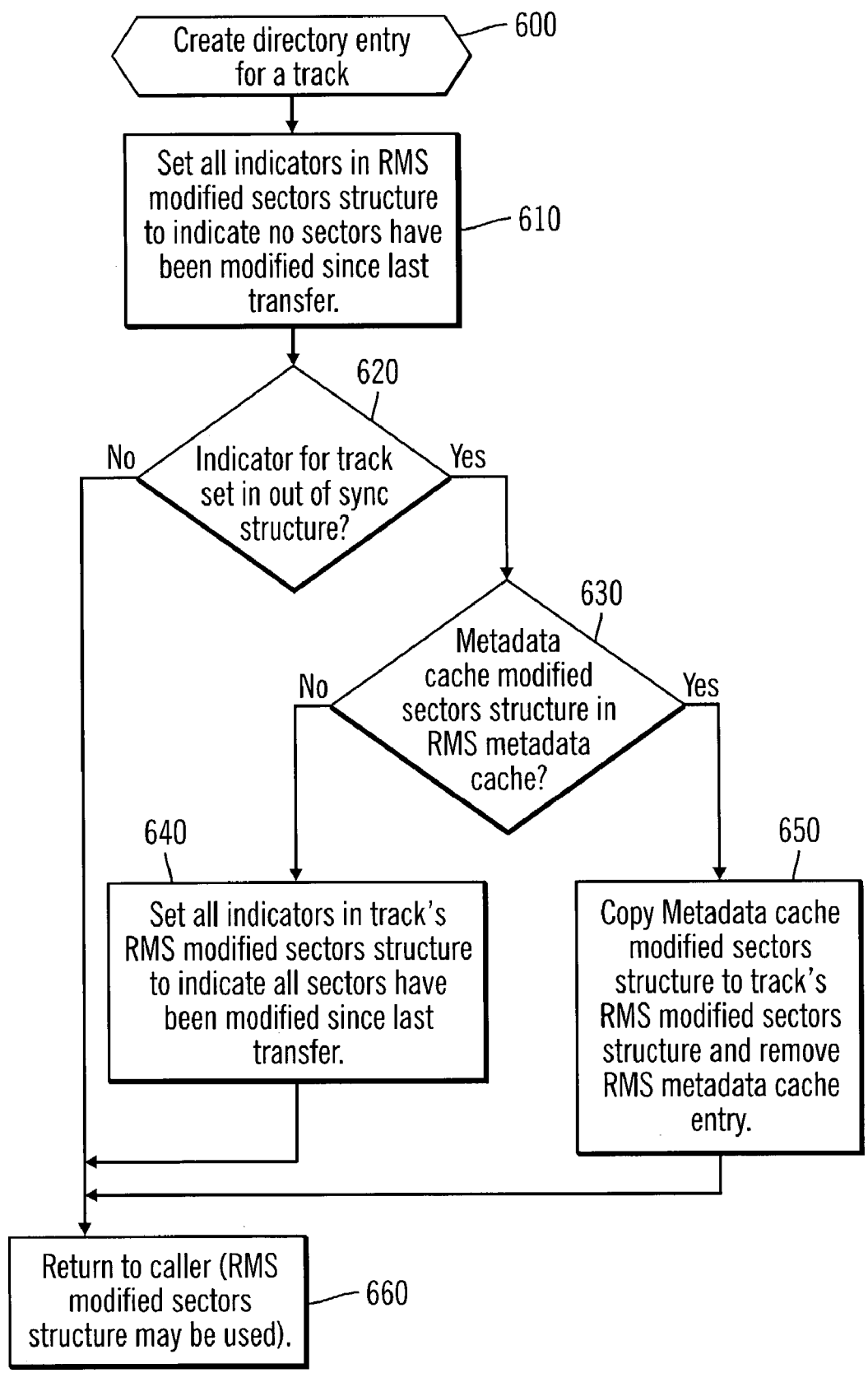
FIG. 6 illustrates logic implemented when a track is promoted in accordance with certain implementations of the invention.

FIG. 6 illustrates logic implemented when a track is promoted in accordance with certain implementations of the invention. Control begins at block 600 with a directory entry being created. In block 610, all indicators in the RMS modified sectors structure are set to indicate that no sectors have been modified since the last transfer of the track to secondary storage 122. In block 620, it is determined whether an indicator for the track is set in the out of sync structure 140. If an indicator is set, processing continues to block 630, otherwise, processing continues to block 660.

In block 630, it is determined whether the metadata cache modified sectors structure is in the RMS metadata cache 166. If so, processing continues to block 650, otherwise processing continues to block 640. In block 640, all indicators are set in the track's RMS modifies sectors structure 138 to indicate that all sectors have been modified since the last transfer of the track to secondary storage 122. In block 650, the metadata cache modified sectors structure 166 is copied to the track's RMS modified sectors structure 138, and the RMS metadata cache entry for the track is removed from the RMS metadata cache 160. In block 660, processing control is returned to the caller. At this time, the RMS modified sectors structure 138 may be used.

In certain implementations, if a metadata cache is not used, FIG. 6 may be modified to remove blocks 630 and 650, with processing continuing from block 620 to block 640 if the indicator is set. When a track is promoted, if an out of sync indicator is on for a track, the indicator indicates that the track was modified and demoted. All information about modified sectors is lost, so it is assumed that all sectors were modified. Accordingly, all the indicators in the RMS modified sectors bitmap are set (e.g., to one) to indicate that the sectors have been modified since the last transfer to the secondary control unit 120.

Figure 7:
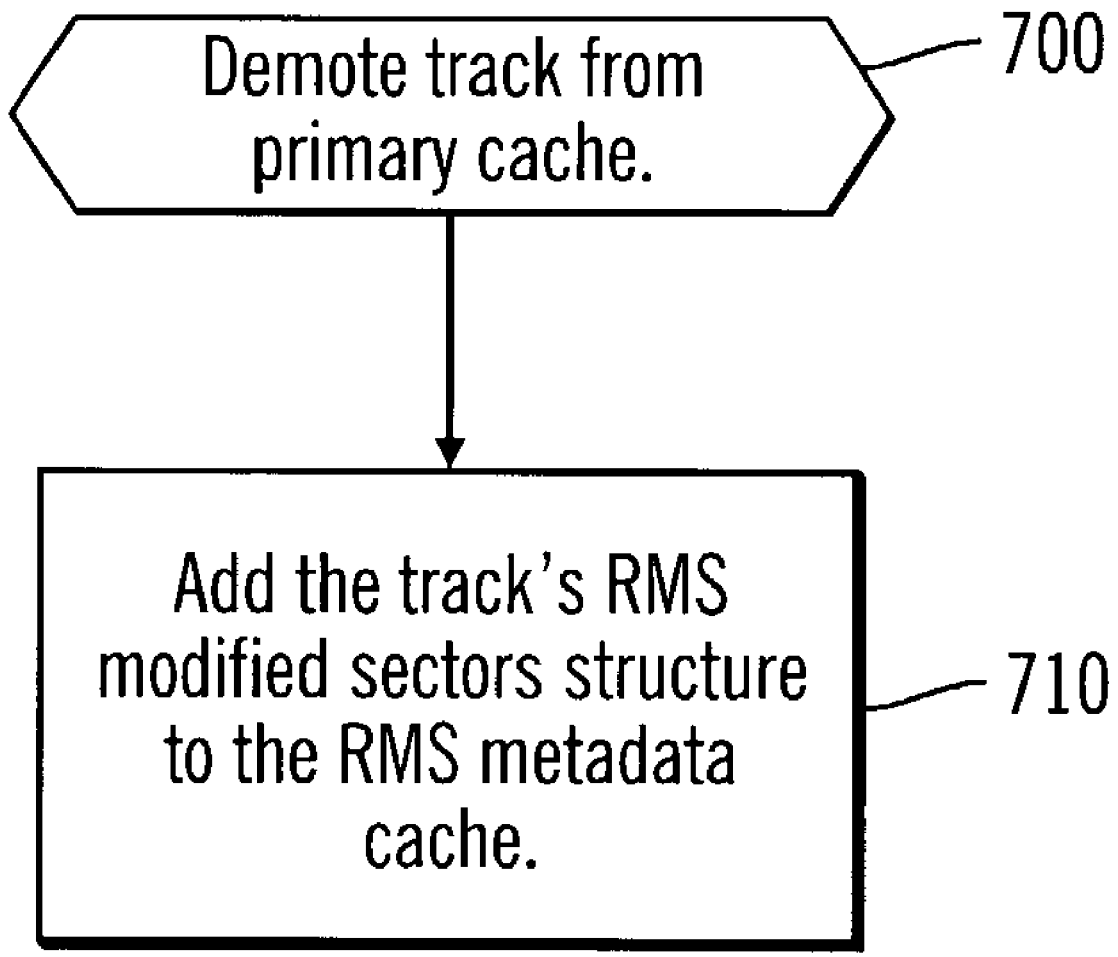
FIG. 7 illustrates logic implemented when a track is being demoted from primary cache in accordance with certain implementations of the invention.

FIG. 7 illustrates logic implemented when a track is being demoted from primary cache 116 in accordance with certain implementations of the invention. Control begins at block 700 with a track being demoted from primary cache 116. Then, in block 710, the track's RMS modified sectors structure 138 is added to the RMS metadata cache 160. In certain implementations, the RMS metadata cache 160 caching policy may reject this information.

In many real world situations, the rate of data transfer to the remote secondary control unit 120 is much smaller than the rate of input that the primary control unit 100 can service. In such cases, even a relatively small RMS metadata cache 160 can improve performance dramatically. Furthermore, if RMS tracks are being demoted before they are transferred to the secondary control unit 120, the system is loaded beyond its average capacity. Without a RMS metadata cache 160, unnecessary full track transfers are introduced, increasing the load even more, so even a short burst of high load may cause unacceptable performance. The RMS metadata cache 160 moves this "meltdown" point to a much higher load.

PPRC and ESCON are trademarks of International Business Machines, Inc.

ADDITIONAL IMPLEMENTATION DETAILS

The described techniques for maintaining information on network components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In certain implementations, the indicators may be bits or other types of indicators. Although, in the examples above, an indicator was set to one to indicate a particular example (e.g., an indicator in an RMS modified sectors structure is set to one to indicate that a sector has been modified), the indicator may be set to another value (e.g., set to zero) to indicate the same example (e.g., an indicator in an RMS modified sectors structure is set to zero to indicate that a sector has been modified).

The logic of FIGS. 3–4 and 6–7 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 3–4 and 6–7 was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

Figure 8:
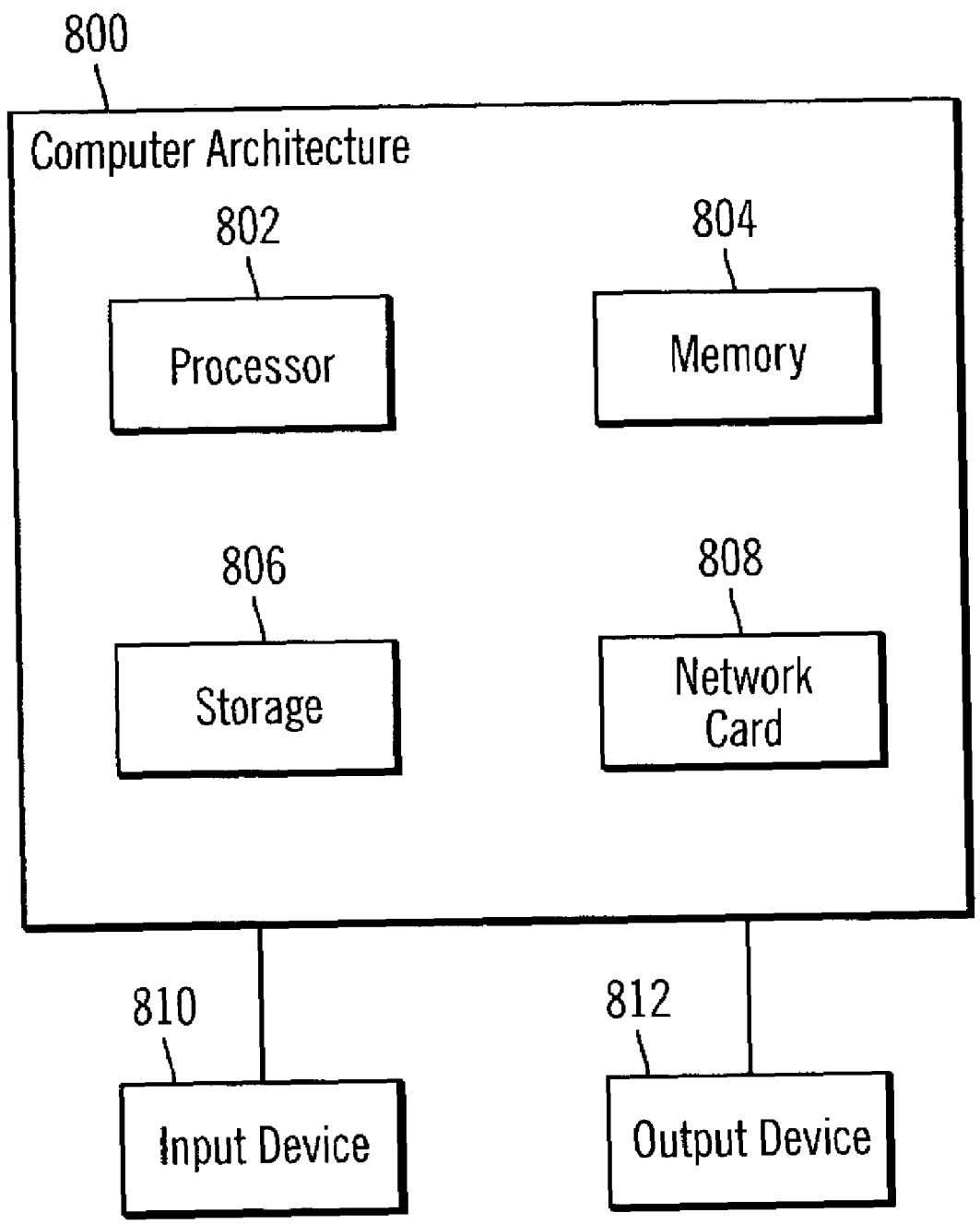
FIG. 8 illustrates one implementation of the architecture of computer systems in accordance with certain implementations of the invention.

FIG. 8 illustrates one implementation of the architecture of the computer systems 100 and 120 in accordance with certain implementations of the invention. The computer systems 100 and 120 may implement a computer architecture 800 having a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for reducing an amount of data transferred, comprising:
maintaining indicators in an out of sync structure that indicate which blocks of data have been modified since a last transfer to remote storage;
maintaining indicators in a modified sub-blocks structure of sub-blocks modified for a block of data since the block of data was last sent to remote storage until the block of data is demoted; and
using the maintained indicators in the modified sub-blocks structure to identify sub-blocks on the block of data for transfer to the remote storage.

2. The method of claim 1, further comprising:
transferring sub-blocks of the block of data whose indicators indicate tat the sub-blocks have been modified since the block of data was last sent to the remote storage.

3. The method of claim 1, further comprising:
receiving a host request to access the block of data.

4. The method of claim 3, further comprising:
determining that the block of data does not exist in a primary cache; and
promoting the block of data to the primary cache.

5. The method of claim 3, wherein the host request comprises a write request, and further comprising:
writing the block of data;
updating indicators for sub-blocks written by the host in the modified sub-blocks structure; and
updating the indicators for sub-blocks written by the host in a copy of the modified sub-blocks structure.

6. The method of claim 5, wherein updating the indicators for sub-blocks written byte host in the copy of the modified sub-blocks structure occurs at or before updating.

7. The method of claim 5, wherein updating the indicators for sub-blocks written by the host in the copy of the modified sub-blocks structure occurs after updating.

8. The method of claim 3, wherein the host request comprises a read request, further comprising:
determining whether a portion of the block of data to be accessed by the read request is in primary cache;
if the portion of the block of data to be accessed is in the primary cache, reading the block of data; and
if the portion of the block of data to be accessed is not in primary cache, staging the portion of the block of data to the primary cache.

9. The method of claim 1, further comprising:
determining that an indicator is set in an out of sync structure for the block of data that indicates that the block of data has been modified since the block of data was last transferred to the remote storage.

10. The method of claim 9, further comprising:
determining that the block of data does not exist in a primary cache; and
promoting the block of data to the primary cache.

11. The method of claim 1, further comprising:
demoting a block of data from a primary cache; and
adding a remote mirroring system modified sub-blocks structure to a metadata cache.

12. A method for reducing an amount of data transferred, comprising:
maintaining indicators of sub-blocks modified for a block of data since the block of data was last sent to remote storage until the block of data is demoted, wherein the maintained indicators are used to identify sub-blocks an the block of data for transfer to the remote storage;
receiving a host request to access the block of data;
determining that the block of data does not exist in a primary cache; and
promoting the block of data to the primary cache;
in response to promoting the block of data,
determining whether an out of sync indicator indicates that the block of data has been modified; and
if the out of sync indicator indicates that the block of data has been modified, setting indicators in a copy of a modified sub-blacks structure to indicate tat all sub-blocks of the block of data have been modified since the block of data was last transferred to the remote storage.

13. A method for reducing an amount of data transferred, comprising:
maintaining indicators of sub-blocks modified for a block of data since the block of data was last sent to remote storage until the block of data is demoted, wherein the maintained indicators are used to identify sub-blocks on the block of data for transfer to the remote storage;
determining whether an out of sync indicator indicates that the block of data has been modified and whether all indicators in a copy of a modified sub-blocks structure are set to indicate that no sub-blacks in the block of data have been modified since the block of data was last transferred to the remote storage; and
if the out of sync indicator indicates that the block of data has been modified and the indicators in the copy of the modified sub-blocks structure are set to indicate that no sub-blocks in the block of data have been modified, setting indicators in the copy of the modified sub-blocks structure to indicate tat all subblocks of the block of data have been modified since the block of data was last transferred to the remote storage.

14. A method for reducing an amount of data transferred, comprising:
maintaining indicators of sub-blocks modified for a block of data since the block of data was last sent to remote storage until the block of data is demoted, wherein the maintained indicators are used to identify sub-blocks on the block of data for transfer to the remote storage;
determining that an indicator is set in an out of sync structure for the block of data that indicates that the block of data has been modified since the block of data was last transferred to the remote storage;
determining that the block of data does not exist in a primary cache;
promoting the block of data to the primary cache; and
if the out of sync indicator indicates that the block of data has been modified, setting indicators in a copy of a modified sub-blocks structure to indicate that all sub-blocks of the block of data have been modified since the block of data was last transferred to the remote storage.

15. The method of claim 14, further comprising:
determining whether all sub-blocks of the block of data that have been modified since the block of data was last sent to the remote storage are in primary cache; and
if not all of the sub-blocks are in the primary cache, staging the sub-blocks that are not already in the primary cache into the primary cache.

16. The method of claim 15, further comprising:
transferring sub-blocks of the block of data whose indicators are set in a remote mirroring system modified sub-blocks structure to indicate that the sub-blocks have been modified since the block of data was last sent to the remote storage; and
clearing the indicators to indicate that the sub-blocks have not been modified since block of data was last transferred to the remote storage.

17. A method for reducing an amount of data transferred, comprising:
maintaining indicators of sub-blocks modified for a block of data since the block of data was last sent to remote storage until the block of data is demoted, wherein the maintained indicators are used to identify sub-blocks on the block of data for transfer to the remote storage;
determining that an indicator is set in an out of sync structure for the block of data that indicates that the block of data has been modified since the block of data was last transferred to the remote storage;
determining that the block of data does not exist in a primary cache; and
promoting the block of data to the primary cache;
determining whether all indicators in a copy of a modified sub-blocks structure are set to indicate that no sub-blocks in the block of data have been modified since the block of data was last transferred to the remote storage; and
if the out of sync indicator indicates that the block of data has been modified and the indicators in the copy of the modified sub-blocks structure are set to indicate that no sub-blocks in the block of data have been modified, setting indicators in the copy of the modified sub-blocks structure to indicate that all sub-blocks of the block of data have been modified since the block of data was last transferred to the remote storage.

18. The method of claim 17, further comprising:
determining whether all sub-blocks of the block of data that have been modified since the block of data was last sent to the remote storage are in primary cache; and
if not all of the sub-blocks are in the primary cache, staging the sub-blocks that are not already in the primary cache into the primary cache.

19. The method of claim 18, further comprising:
transferring sub-blocks of the block of data whose indicators are set in a remote mirroring system modified sub-blocks structure to indicate that the sub-blocks have been modified since the block of data was last sent to the remote storage; and
clearing the indicators to indicate that the sub-blocks have not been modified since block of data was last transferred to the remote storage.

20. A method for reducing an amount of data transferred, comprising:
maintaining indicators of sub-blocks modified for a block of data since the block of data was last sent to remote storage until the black of data is demoted, wherein the maintained indicators are used to identify sub-blocks on the block of data for transfer to the remote storage;
determining that a second block of data is to be promoted into primary cache; and
setting all indicators to indicate that sub-blocks for the second block of data have not been modified since the second block of data was last transferred to remote storage.

21. The method of claim 20, further comprising:
determining whether an indicator in an out of sync structure indicates that the block of data has been modified; and
if the indicator indicates that the block of data has been modified, determining whether a metadata cache modified sub-blocks structure is available for the block of data.

22. The method of claim 21, further comprising:
if the metadata cache modified sub-blocks structure is not available, setting all indicators in a remote mirroring system modified sub-blocks structure for the block of data to indicate that all sub-blocks have been modified since the block of data was last transferred to the remote storage.

23. The method of claim 21, further comprising:
if the metadata cache modified sub-blocks structure is available, copying the metadata cache modified sub-blocks structure to a remote mirroring system modified sub-blocks structure.

24. The method of claim 23, further comprising:
removing the metadata cache modified sub-blocks structure from a metadata cache.

25. The method of claim 21, further comprising:
if the metadata cache modified sub-blocks structure is available, linking the metadata cache modified sub-blocks structure to a remote mirroring system modified sub-blocks structure.

26. A system for reducing an amount of data transferred, comprising:
means for maintaining indicators in an out of sync structure that indicate which blocks of data have been modified, since a last transfer to remote storage;
means for maintaining indicators in a modified sub-blocks structure of sub-blocks modified for a block of data since the block of data was last sent to remote storage until the block of data is demoted; and means for using the maintained indicators in the modified sub-blocks structure to identify sub-blocks on the block of data for transfer to the remote storage.

27. The system of claim 26, further comprising:

means for transferring sub-blocks of the block of data whose indicators indicate that the sub-blocks have been modified since the block of data was last sent to the remote storage.

28. The system of claim 26, further comprising:

means for, if an out of sync indicator indicates that the block of data has been modified, setting indicators in a copy of a modified sub-blocks structure to indicate that all sub-blocks of the block of data have been modified since the block of data was last transferred to the remote storage.

29. The system of claim 26, further comprising:

means for writing the block of data;

means for updating indicators for sub-blocks written by the host in the modified sub-blocks structure; and means for updating the indicators for sub-blocks written by the host in a copy of the modified sub-blocks structure.

30. The system of claim 26, further comprising:

means for, if an out of sync indicator indicates that the block of data has been modified and indicators in a copy of the modified sub-blocks structure are set to indicate that no sub-blocks in the block of data have been modified, setting indicators in the copy of the modified sub-blocks structure to indicate that all sub-blocks of the block of data have been modified since the block of data was last transferred to the remote storage.

31. The system of claim 26, further comprising:

determining tat a second block of data is to be promoted into primary cache;

setting all indicators to indicate that sub-blocks for the second block of data have not been modified since the second block of data was last transferred to remote storage.

32. The system of claim 31, further comprising:

determining that an indicator in the out of sync structure indicates that the block of data has been modified;

determining whether a metadata cache modified sub-blocks structure is available for the block of data;

in response to determining that the metadata cache modified sub-blocks structure is not available, setting all indicators in a remote mirroring system modified sub-blocks structure for the black of data to indicate that all sub-blocks have been modified since the block of data was last transferred to the remote storage; and in response to determining that the metadata cache modified sub-blocks structure is available, copying the metadata cache modified sub-blocks structure to a remote mirroring system modified sub-blocks structure.

33. An article of manufacture embodied as a computer-readable medium for reducing an amount of data transferred, wherein the article of manufacture causes operations, the operations comprising:

maintaining indicators in an out of sync structure that indicate which blocks of data have been modified since a last transfer to remote storage;

maintaining indicators in a modified sub-blocks structure of sub-blocks modified for a block of data since the block of data was last sent to remote storage until the block of data is demoted; and using the maintained indicators in the modified sub-blocks structure to identify sub-blocks on the block of data for transfer to the remote storage.

* * * * *